July 25, 1933.  A. I. DEAN  1,919,619
SPREADING APPARATUS
Filed April 14, 1930   2 Sheets-Sheet 1
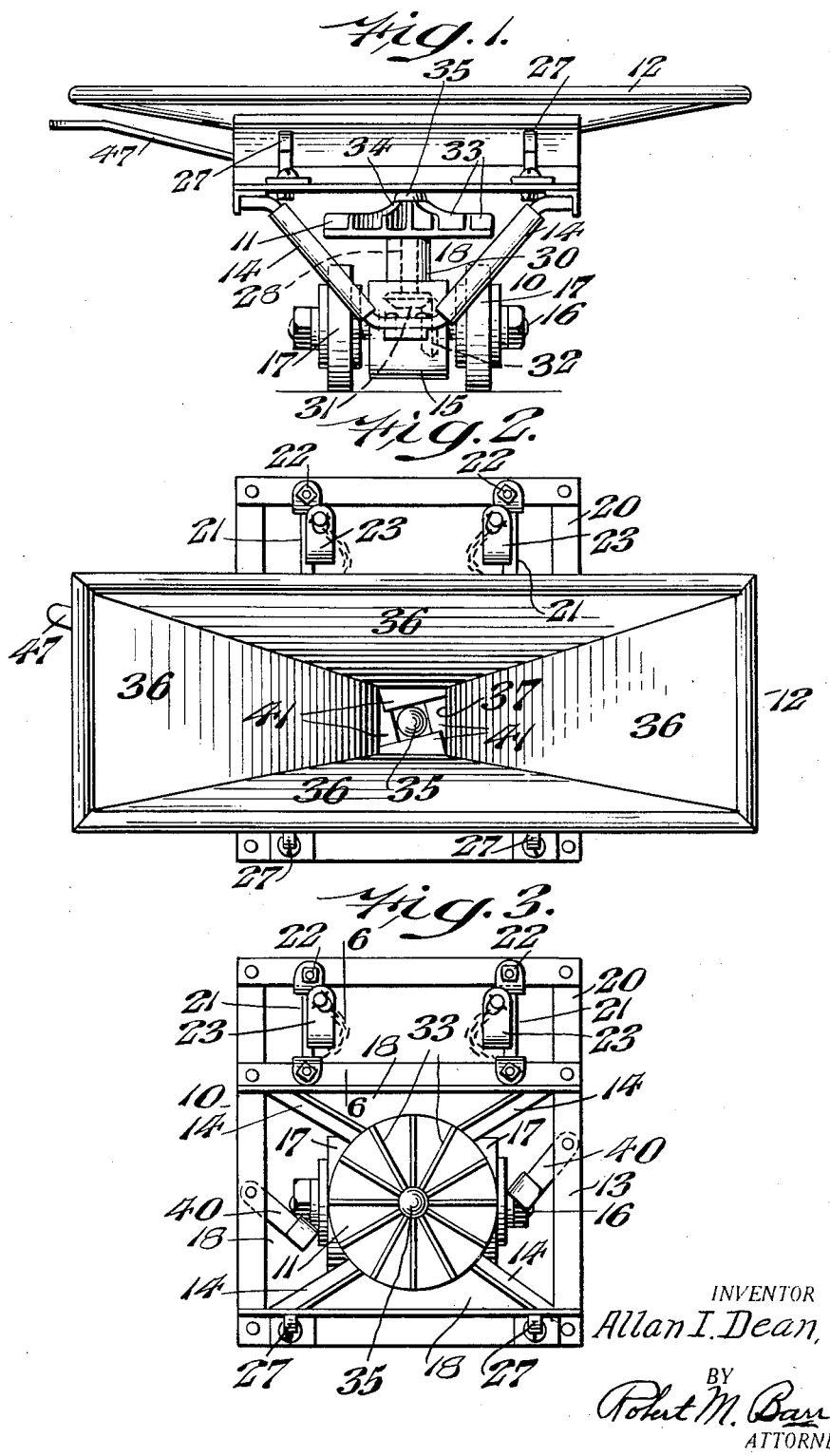
INVENTOR
Allan I. Dean,
BY
Robert M. Barr
ATTORNEY July 25, 1933. A. I. DEAN 1,919,619
SPREADING APPARATUS
Filed April 14, 1930 2 Sheets-Sheet 2

INVENTOR.
Allan I. Dean,
BY Robert M. Barr.
ATTORNEY.

Patented July 25, 1933

1,919,619

UNITED STATES PATENT OFFICE

ALLAN I. DEAN, OF YEADON, PENNSYLVANIA, ASSIGNOR TO GOOD ROADS COMPANY, INC., OF UPPER DARBY, PENNSYLVANIA, A CORPORATION OF PENNSYLVANIA

SPREADING APPARATUS

Application filed April 14, 1930. Serial No. 444,195.

The present invention relates to road building machinery and more particularly to a mechanical spreader for distributing stone chips, gravel, sand or any other loose material over a surface while in motion.

Some of the objects of the present invention are to provide an improvement upon the type of spreading apparatus which forms the subject matter of Patent No. 1,715,325; to provide a spreader wherein provision is made for uniformly distributing material as received from a continuously unregulated source of supply; to provide an improved hopper construction for spreaders; to provide a hopper with means for varying the quantity of material delivered to the distributing means while maintaining a constant feeding speed; to provide a control for the hoppers of spreading machines wherein the size of the discharge outlet can be varied at will and at the same time maintaining a coaxial relation between the outlet and the distributing disc; to provide a receiving and discharging hopper for spreaders wherein it is impossible for the material to overflow about the top of the hopper in case the outlet to the distributing means becomes clogged; to provide a flexible control for spreaders so that all kinds of materials varying in size, weight and consistency can be efficiently handled in the same spreader; and to provide other improvements as will hereinafter appear.

Figure 4:
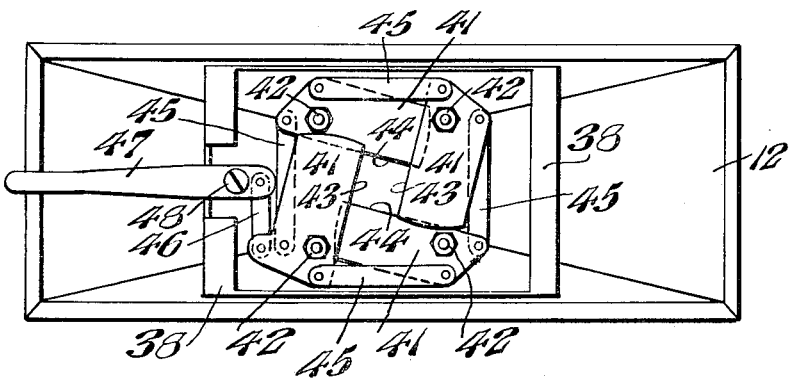
Figure 5:
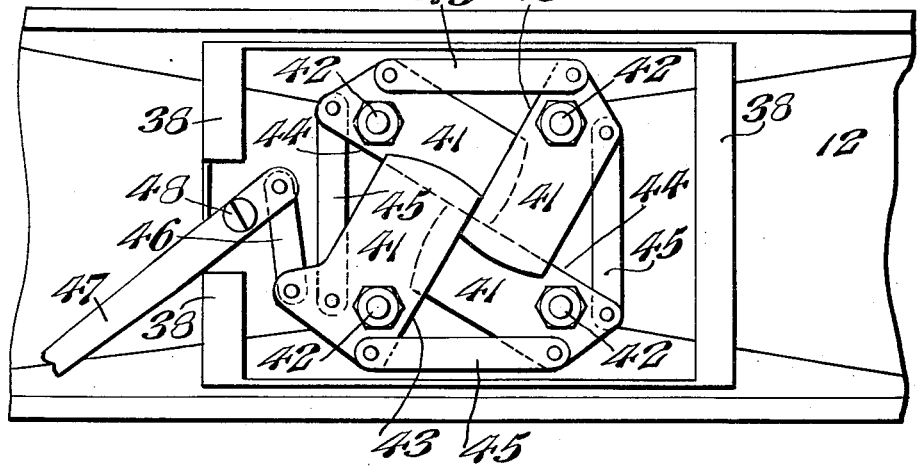
Figure 6:
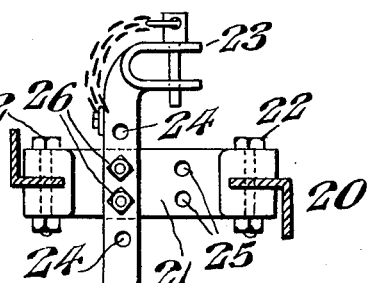

In the accompanying drawings Fig. 1 represents a front elevation of a spreading vehicle embodying one form of the present invention; Fig. 2 represents a plan of the same; Fig. 3 represents a plan of the same with the hopper removed; Fig. 4 represents a bottom plan of the hopper; Fig. 5 represents a detail of the shutter showing the parts positioned to form a restricted opening; and Fig. 6 represents a detail section on line 6—6 of Fig. 3.

Referring to the drawings one form of the present invention comprises a wheeled body 10 carrying a rotatable spreader disc 11, and a hopper 12 for delivering material to the disc 11 for spreading purposes.

The body 10, as here shown, consists of an angle iron frame forming a square open top 13 with depending supporting arms 14 attached to a bearing housing 15 in which is journalled the shaft 16 upon the ends of which are the vehicle wheels 17. Thus the top 13 is elevated above the wheels 17 so that effective discharge openings 18 are provided at all sides for the passage of the outwardly thrown material. The rear of the body frame is provided with an extension 20 carrying two bars 21 which are mounted for sliding movement in the extension 20 for adjustment towards and away from each other. Suitable bolts 22 serve to anchor the bars 21 in any selected operative position. Each of the bars 21 mounts a coupling 23 which are of bifurcated form to interfit with a cooperating part upon the chassis of a truck or other vehicle to which the body is attached for use. These couplings 23 are provided with a number of holes 24 for vertical adjustment relation to the bars 21, while the bars 21 have holes 25 for lateral adjustment of the couplings 23. Bolts 26 serve to anchor the couplings 23 in any adjusted position. The opposite side of the body frame is preferably provided with hooks 27 to which chains can be connected to transport the spreader upon the rear of a motor truck.

The disc 11 serves to throw the material outwardly and for that purpose is mounted upon a shaft 28 which is journalled in an upstanding bearing 30 forming a part of the housing 15 and receives motion by way of a bevel gear 31 and bevel gear 32, the former being keyed to the shaft 28 and the latter to the shaft 16. Thus in operative position the disc 11 rotates in a substantially horizontal plane and distributes the material in all directions outwardly therefrom. Distributing vanes 33 rise vertically and radially from the upper or material receiving face of the disc 11 and preferably these vanes taper upwardly to form an upstanding hub 34. A rounded cap or head 35 is attached to the end of the shaft 28 for guiding the material to the vanes.

For receiving the material from a dumping truck or other source of supply and delivering it to the spreading disc 11, the hopper 12 is provided, the same being preferably of rectangular shape with sides 36 downwardly converging to a discharge mouth 37.

Attached to the bottom of the hopper is a base frame 38 of a size to seat snugly on the top of the body frame and to which it is fastened in a removable manner by pivoted latches 40. The mouth 37 is preferably substantially square in shape and of a size to pass the maximum amount of material which the disc 11 is able to handle efficiently, though in this connection it is desirable to have a mouth which can be varied as to size in order to meet every condition of use as well as all classes of material.

For the purpose of so varying the size of the discharge or feeding mouth 37, a plurality of shutter leaves 41, preferably four, are pivoted respectively to pivot pins 42 attached to and projecting from the bottom of the hopper 12. The pins 42 are so located as to form the corners of a square which is co-axially disposed with respect to the mouth 37. The size, shape and pivotal arrangement of the shutter leaves 41 is such that one pair of leaves swings in a plane with the opposed or meeting edges 42 always parallel to each other, while the other pair swings in a parallel closely adjacent plane with the opposed or meeting edges 44 always parallel to each other. The two sets of edges 43 and 44 therefore always form the sides of a square the dimensions of which vary from zero to the size of the mouth 37 according to the set positions of the leaves 41. Movement is simultaneously transmitted to the leaves 41 by pivoted links 45 connecting all of the leaves in pairs, while a thrust link 46 serves as a common motion transmitting means from a lever 47 pivoted at 48 to the hopper 13. The free end of the lever 47 is brought to a conveniently accessible location at one side of the hopper 12.

In operation the spreading vehicle is attached to the dumping end of a truck or other vehicle by means of the couplings 23 which are so adjusted and fixed in position as to locate one side of the hopper 12 in such close proximity to the truck as will ensure all material being discharged thereinto in all discharging positions of the truck body. The control lever 47 is now moved to the position to cause the shutter leaves 41 to assume the position necessary to give the required or selected size of control opening and the machine is then ready to operate. The dump body of the material truck is now elevated to to cause the material to discharge by gravity through the passage provided by opening the tail gate of the truck and into the hopper 12. With the truck in motion pushing the wheeled body before it, the material flowing through the shutter opening falls upon the rotating disc 11 and is thrown off upon the roadway in an even and uniform manner. The regulation of the flow from the hopper 12 to the disc 11 takes place by varying the opening of the shutter leaves 41 and as these operate simultaneously and advance and recede, while maintaining the same relation one to the other, the opening is always co-axially disposed with respect to the shaft upon which the disc 11 is mounted. This construction makes it unnecessary to use the gate in the tail board of the truck for controlling the flow of material.

Having thus described my invention, I claim:

1. A spreader apparatus for roadways comprising the combination of a wheeled body, a spreader rotatably mounted on said body, a hopper carried by said body having an outlet located to discharge material upon said spreader, a plurality of shutters arranged in pairs respectively in parallel planes, means for mounting each pair of shutters to maintain two opposed edges in parallel relation in all positions of said shutters, these opposed edges of all of said shutters forming an opening in register with said outlet, and means to move said shutters in synchronism to either increase or decrease the size of said opening.

2. A spreader apparatus for roadways comprising the combination of a wheeled body, a spreader rotatably mounted on said body, a hopper carried by said body having an outlet located to discharge material upon said spreader, a plurality of shutters arranged in pairs respectively in parallel planes, means for mounting each pair of shutters to maintain two opposed edges in parallel relation in all positions of said shutters, these opposed edges of all of said shutters forming an opening in register with said outlet, and means including interconnecting links for maintaining said opening in co-axial relation to said discharge outlet in all positions of said shutters, and means for moving said shutters to form an opening of predetermined size.

ALLAN I. DEAN.